Sept. 20, 1971    C. G. P. OLDERSHAW    3,605,983

CORN ORIENTING APPARATUS AND METHOD

Filed Aug. 14, 1969

INVENTOR.
C.G. PETER OLDERSHAW

BY Thomas V. Sullivan

ATTORNEY

United States Patent Office 3,605,983
Patented Sept. 20, 1971

3,605,983
CORN ORIENTING APPARATUS AND METHOD
Charles George Peter Oldershaw, Avon, N.Y., assignor to General Foods Corporation, White Plains, N.Y.
Filed Aug. 14, 1969, Ser. No. 850,188
Int. Cl. B65g 47/24
U.S. Cl. 198—30                                                10 Claims

ABSTRACT OF THE DISCLOSURE

An apparatus for orienting tapered agricultural products such as corn so that the products are discharged from the apparatus with their larger diameter end forward.

---

This invention relates to an apparatus for orienting tapered agricultural products, such as corn, and to a method therefor. More particularly, it relates to an apparatus for orienting tapered agricultural products, such as corn, so that products are discharged from the apparatus with their larger diameter end forward.

Commercial processing of tapered agricultural products for canning and freezing ordinarily necessitates that the products be oriented or aligned with the larger diameter end in one and the same direction. Such orienting and aligning of the tapered agricultural product is necessary to facilitate further procesisng, as, for example, the debutting of unhusked corn, the husking of unhusked corn, and mechanical feeding of husked corn into existing corn cutting machinery. Until quite recently, such tapered agricultural products were oriented and aligned by hand and then fed into debutting, husking and cutting machinery. Obviously, such orienting or aligning by hand involves considerable manpower requirements in that visual inspection of the product is necessary and the speed at which orienting and aligning can be carried out is limited by many factors including safety.

An object of the present invention is to provide an apparatus for orienting tapered agricultural products, such as corn, at high speeds without hand feeding.

Another object of the present invention is to provide an apparatus whereby tapered agricultural products can be oriented in a continuous manner with their larger diameter end first in one and the same direction.

It is yet another object of this invention to provide an apparatus for orienting tapered agricultural products which allows for mechanical feeding of the product into machines for further processing.

It is a still further object of this invention to provide an apparatus for orienting tapered agricultural products in a simplified manner by permitting gravitational force and rotation to act upon the products so that the products become oriented and aligned with their larger diameter end forward.

Other objects and advantages of the invention will become apparent from specification and claims and consideration of the accompanying drawings which are to be taken in connection with the description.

In the drawings—

Figure 1:
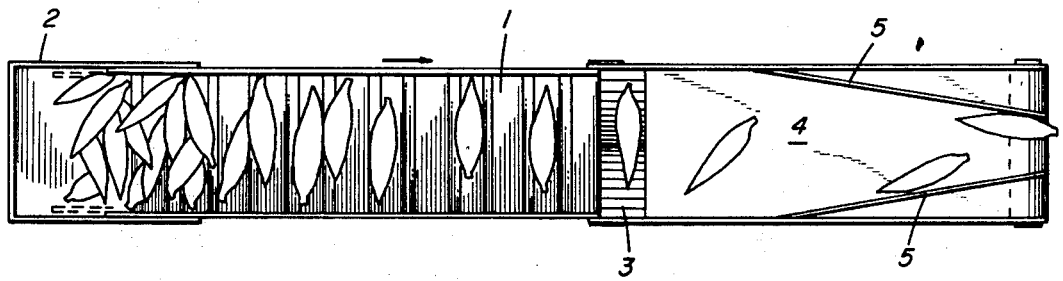
FIG. 1 is a top plan view of one embodiment of a corn orienting apparatus of the present invention.
Figure 2:
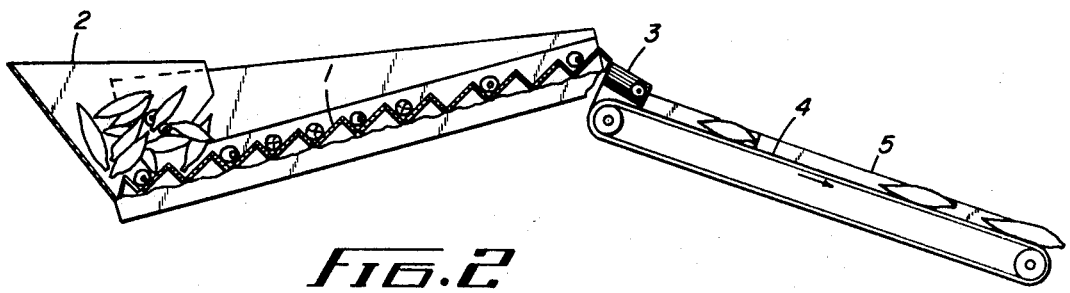
FIG. 2 is a cut-away side view of the apparatus of FIG. 1.
Figure 4:
FIG. 4 is a partial sectional view of the trough-like member 3.

Referring to the drawings in detail wherein similar reference characters designate corresponding parts through the several views, one embodiment of the apparatus is illustrated in FIG. 1 (plan view), FIG. 2 (side elevation, cut-away view) and FIG. 4 (partial sectional view) and in which 1 represents a commercially available shuffle feeder in which corn dumped into inlet hopper 2 is delivered at the discharge end one at a time, broadside to the direction of flow, i.e., with the longitudinal axis perpendicular to the direction of flow. As each ear of corn is discharged broadside from the shuffle feeder, it is transferred onto a trough-like member 3. This trough-like member which is stationary and is mounted to the frame (not shown) is inclined toward the horizontal with a slope sufficient to promote downward rolling of the ear of corn. The curved surface of the trough-like member is long enough only to initiate rolling of the ear of corn in an arcuate path. The radius of curvature of the trough-like member is such that the ear of corn is supported at its larger diameter or butt end and at or near its tip end, thereby increasing the tendency of the ear of corn to roll in an arcuate path.

A belt conveyor 4 is sloped downward from the shuffle feeder discharge and is inclined at an angle slightly less than the angle at which the trough-like member is sloped. This belt moves in the direction indicated by the arrow in FIG. 2. A pair of guide rails 5 mounted above and just clear of the belt's top surface deflect the corn toward the middle of the belt at the discharge end. Because the corn, both husked and unhusked, is circular in cross section and generally tapered toward the tip as it rolls down the incline, it rolls toward the edge of the belt adjacent to the tip end of each ear. Some ears, having a very pronounced taper, turn nearly 90° before contacting the guide rail, while others roll toward one of the side rails and are then swung around by the retarding action of the tip contacting the rail. Thus the ears reach the lower discharge end of the belt all with their larger diameter or butt end foremost.

Figure 3:
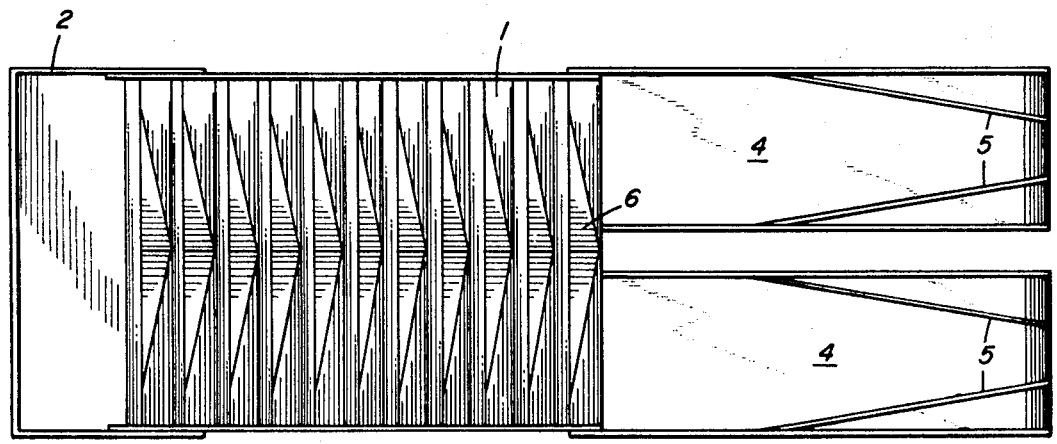
FIG. 3 is a top plan view of another embodiment of the corn orienting apparatus of the present invention.

Another embodiment of the present invention is represented in FIG. 3 which shows a shuffle feeder 2 arranged to discharge two longitudinally aligned rows of product onto two separate inclined conveyor belts 4 having guide rails 5. The shuffle feeder includes upstanding baffle plates 6 mounted on the front face of each shuffle flight. The plates serve to deflect the product away from the middle of the flights of the shuffle feeder toward the outside edge of the flights so as to position product toward the middle of each of the conveyor belts. A trough-like member may also be incorporated to receive product discharged from the shuffle feeder and onto the conveyor belts as indicated in FIGS. 1, 2 and 4.

Because the inclined moving belt provides an unobstructed rolling surface for each succeeding ear of corn, the ears can be deposited onto the belt in rapid succession.

Repeated short runs were made, on unhusked corn, with a shuffle feeder operating at 100 strokes per minute, the belt sloped downward 19° from the horizontal, and belt speed at 110 feet per minute. It was observed that a high percentage of the unhusked corn was correctly oriented by this apparatus. By employing a trough-like member, correct orientation of the unhusked corn with the larger diameter end forward was significantly improved.

From the foregoing description, it can be seen that an apparatus for orienting tapered agricultural products such as corn is characterized by its simplicity and speed in operation. While the description herein has been essentially concerned with orienting or aligning corn, it is apparent that the apparatus is well adapted for processing other tapered agricultural products as, for example, carrots, certain types of squash and the like, such products being characterized by being essentially round in cross section and generally having one end of greater diameter than the other. Thus, as the apparatus receives the tapered agricultural products, they are rapidly oriented for delivery to the next step in the processing, such orienting taking place by means of gravitational force and rotation which are caused to act upon the products. Moreover, as has also been described, the accuracy of orientation makes the apparatus especially suitable for high speed process of tapered agricultural products since hand labor is considerably minimized in re-orienting misoriented products.

Although the drawings and specification set forth preferred embodiments of the invention, it is apparent that these are by way of example only and that numerous details in construction can be made, providing the same do not depart from the spirit and scope of the invention as defined in the appended claims.

What is claimed is:

1. Apparatus for orienting tapered agricultural products with their larger diameter end in the same direction comprising:
   means for longitudinally aligning said products;
   transferring means for transferring the longitudinally aligned products from said aligning means to an endless belt which is inclined toward the horizontal and adapted to move in the inclined direction;
   guide means positioned above the surface of said belt and adapted to retain said products on said belt;
       said belt and said guide means arranged so that products transferred from said aligning means onto said belt roll on said belt in an arcuate path and are deflected by said guide means.

2. An apparatus as in claim 1 in which the transferring means is a trough-like member inclined toward the horizontal.

3. An apparatus as in claim 2 in which said guide means have converging side walls and are so constructed and arranged so as to deflect each of said products toward the middle of the belt at the discharge end thereof.

4. An apparatus as in claim 3 in which said transferring means is inclined toward the horizontal at an angle slightly greater than the angle at which said endless belt is inclined toward the horizontal.

5. An apparatus as in claim 4 further comprising:
   an upstanding baffle on said aligning means for positioning said products in the middle of said transferring means.

6. An apparatus for orienting an ear of corn with its larger diameter end in one direction comprising:
   means for longitudinally aligning said ear;
   transferring means for transferring the longitudinally aligned ear from said aligning means to an endless belt which is inclined towards the horizontal and adapted to move in the inclined direction;
   guide means positioned above the surface of said belt and adapted to retain said ear on said belt;
       said belt and said guide means arranged so that said ear transferred from the aligning means onto the belt rolls on the belt in an arcuate path and is deflected by said guide means.

7. An apparatus as in claim 6 in which the transferring means is a trough-like member inclined toward the horizontal.

8. An apparatus as in claim 7 in which said guide means have converging side walls and are so constructed and arranged so as to position said ear toward the middle of the belt at the discharge end thereof.

9. An apparatus as in claim 8 in which said transferring means is inclined toward the horizontal at an angle slightly greater than the angle at which said endless belt is inclined toward the horizontal.

10. A method of orienting tapered agricultural products with their larger diameter ends in the same direction comprising:
   longitudinally aligning said products;
   transferring the longitudinally aligned products onto a trough-like member and from said trough-like member onto a downwardly inclined moving belt whereby each of said products rolls on the belt in an arcuate path to position its larger diameter end downward;
   deflecting each of said products as it rolls toward the edge of said moving belt; and
   discharging the oriented products from the end of said moving belt.

References Cited

UNITED STATES PATENTS

| | | | |
|---|---|---|---|
| 2,728,443 | 12/1955 | Pike | 198—30 |
| 3,268,057 | 8/1966 | Ross | 198—30X |

GERALD M. FORLENZA, Primary Examiner

G. F. ABRAHAM, Assistant Examiner

U.S. Cl. X.R.

198—33AB, 45